US011748369B2

(12) United States Patent
Saenz et al.

(10) Patent No.: US 11,748,369 B2
(45) Date of Patent: Sep. 5, 2023

(54) SEPARATION OF LOGICAL AND PHYSICAL STORAGE IN A DISTRIBUTED DATABASE SYSTEM

(71) Applicant: Microsoft Technology Licensing, LLC, Redmond, WA (US)

(72) Inventors: Alejandro Hernandez Saenz, Kirkland, WA (US); Cristian Diaconu, Kirkland, WA (US); Krystyna Ewa Reisteter, Kirkland, WA (US); Naveen Prakash, Sammamish, WA (US); Sheetal Shrotri, Redmond, WA (US); Rogério Ramos, Redmond, WA (US); Alexander Budovski, Boonville, MO (US); Hanumantha Rao Kodavalla, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 106 days.

(21) Appl. No.: 17/465,298

(22) Filed: Sep. 2, 2021

(65) Prior Publication Data
US 2023/0046342 A1 Feb. 16, 2023

Related U.S. Application Data

(60) Provisional application No. 63/232,619, filed on Aug. 12, 2021.

(51) Int. Cl.
*G06F 16/00* (2019.01)
*G06F 16/25* (2019.01)
(Continued)

(52) U.S. Cl.
CPC .......... *G06F 16/256* (2019.01); *G06F 16/278* (2019.01); *G06F 16/2272* (2019.01); *G06F 16/24557* (2019.01)

(58) Field of Classification Search
CPC .......... G06F 16/2272; G06F 16/24557; G06F 16/256; G06F 16/278
See application file for complete search history.

(56) References Cited

U.S. PATENT DOCUMENTS 8,825,602 B1 * 9/2014 Desai ................ G06F 16/178
707/649
9,164,702 B1 * 10/2015 Nesbit ................ G06F 3/061
(Continued)

OTHER PUBLICATIONS

"Configuring and using service affinity in Service Fabric", Retrieved From: https://docs.microsoft.com/en-us/azure/service-fabric/service-fabric-cluster-resource-manager-advanced-placement-rules-affinity. Aug. 18, 2017, 5 Pages.
(Continued)

*Primary Examiner* — Diedra McQuitery
(74) *Attorney, Agent, or Firm* — Weaver IP L.L.C.

(57) ABSTRACT

Distributed database systems including compute nodes and page servers are described herein that enable separating logical and physical storage of database files in a distributed database system. A distributed database system includes a page server and a compute node and is configured to store a logical database file that includes data and is associated with a file identifier. Each page server is configurable to store slices (i.e., subportions) of the logical database file. The compute node is coupled to the plurality of page servers and configured to store the logical database file responsive to a received command. In an aspect, such storage may comprise slicing the data comprising the logical database file into a set of slices with each being associated with a respective page server, maintaining an endpoint mapping for
(Continued)

each slice of the first set of slices, and transmitting each slice to the associated for storage thereby.

20 Claims, 9 Drawing Sheets

(51) Int. Cl.
    *G06F 16/27*     (2019.01)
    *G06F 16/22*     (2019.01)
    *G06F 16/2455*     (2019.01)

(56) References Cited

U.S. PATENT DOCUMENTS

| | | | |
|---|---|---|---|
| 11,182,248 B2 * | 11/2021 | Luse | G06F 3/064 |
| 2013/0227201 A1 * | 8/2013 | Talagala | G06F 13/28 |
| | | | 711/103 |
| 2017/0192864 A1 * | 7/2017 | Taylor | G06F 11/2069 |
| 2019/0339886 A1 * | 11/2019 | Devaraju | G06F 3/0604 |
| 2021/0334206 A1 * | 10/2021 | Colgrove | G06F 3/0638 |

OTHER PUBLICATIONS

"International Search Report and Written Opinion Issued in PCT Application No. PCT/US22/035619", dated Sep. 20, 2022, 11 Pages.

* cited by examiner

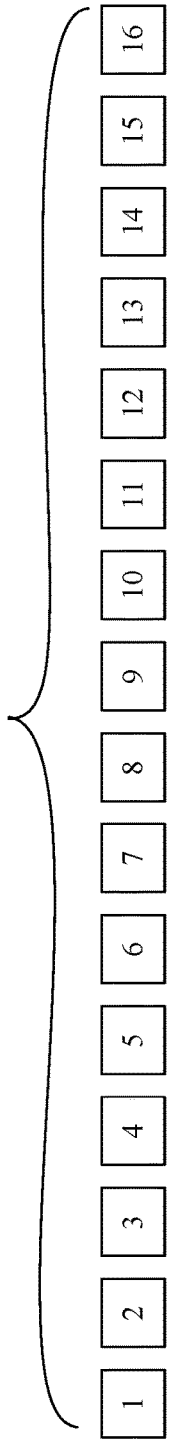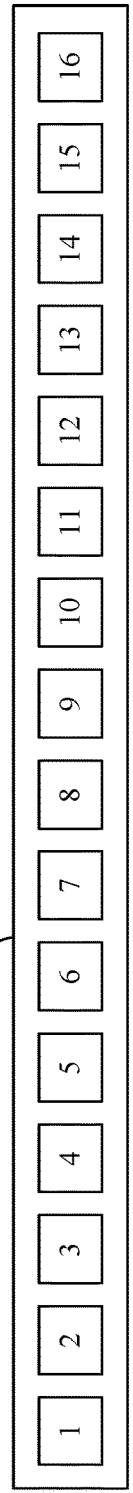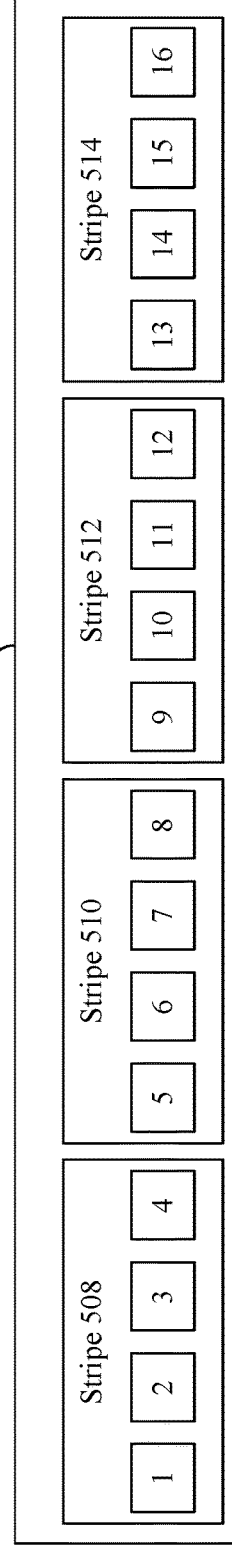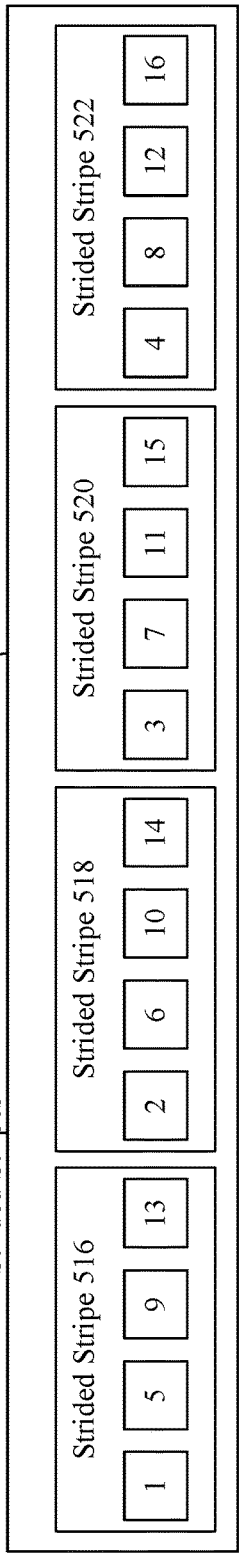
FIG. 5

800

Changing the storage of the first or the second logical database file to use a third storage configuration by a) moving the slices comprising the respective logical database file to one or more new endpoint address and updating the endpoint mapping of each slice to one of the one or more new endpoint addresses, or by b) changing a hardware configuration of the first or the second storage configuration, respectively, to be a third storage configuration. — 802

FIG. 8

SEPARATION OF LOGICAL AND PHYSICAL STORAGE IN A DISTRIBUTED DATABASE SYSTEM

CROSS-REFERENCE TO RELATED APPLICATIONS

This application claims priority to U.S. Provisional Patent Application Ser. No. 63/232,619, filed Aug. 12, 2021, titled "Separation of Logical and Physical Storage in a Distributed Database System," the entirety of which is incorporated by reference herein.

BACKGROUND

Typical distributed database systems divide storage and compute workloads between a number of distributed components. Such a system may include, for example, one or more compute nodes/servers, page servers and storage components. Such systems divide system functions between compute and storage. Compute nodes handle all incoming user queries and query processing activities, whereas page servers couple to storage components to provide a scaled-out storage engine with each page server responsible for a subset of pages of a database. In such a configuration, page servers are limited to serving pages to compute nodes and updating respective pages based on ongoing transaction activity.

Such an architecture enables scaling out to 100+ terabyte-sized databases, fast database restores, near-instantaneous backups, and the ability to rapidly scale up and down. The above-described configuration provides flexibility, scalability and performance for online transaction processing and/or hybrid analytical processing workloads that require high transaction throughput while also enabling real-time analytics.

Such systems may not, however, prove optimal for purely analytical workloads that are scan-intensive over very large data sets because query processing is performed at compute node(s) which necessitates moving large amounts of data from the page servers to the compute nodes for processing. Furthermore, scalability and usability issues arise where logical and physical file storage are closely or wholly coupled.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A distributed database system is provided herein that is configured to decouple a logical database file from its physical storage. In one aspect, the logical database file includes data and is associated with a file identifier and the distributed database system comprises a plurality of page servers, each of which is configurable to store slices (i.e., subportions) of the logical database file. The distributed database system further includes a compute node coupled to the plurality of page servers and configured to store the logical database file responsive to a received command (e.g., an import command or as a result of a query command). In an aspect, such storage may slice the data comprising the logical database file into a set of slices with each slice being associated with a respective page server, maintain an endpoint mapping for each slice of the set of slices, and transmit each slice to the associated for storage thereby.

In another aspect, an endpoint mapping comprises a database file identifier, a slice identifier, and an endpoint address corresponding to the page server associated with the respective slice. In further aspects, different logical database files may be stored using different storage configurations.

In a further aspect, the distributed database system is configured to change the storage of a logical database file from one configuration to another configuration by moving the slices of the logical database file to a new page server with a different configuration and updating the endpoint mapping accordingly, or by changing a hardware configuration of the page server where slices are currently homed.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 5 depicts a block diagram of example data organization of contiguous chunks of data of a logical database file into a cell, striped cell, and striped/strided cell, according to an example embodiment.

FIG. 8 depicts a flowchart of a refinement to the method of FIG. 7 providing a method for changing physical storage configurations of data stored in a distributed database, according to an example embodiment.

Figure 1:
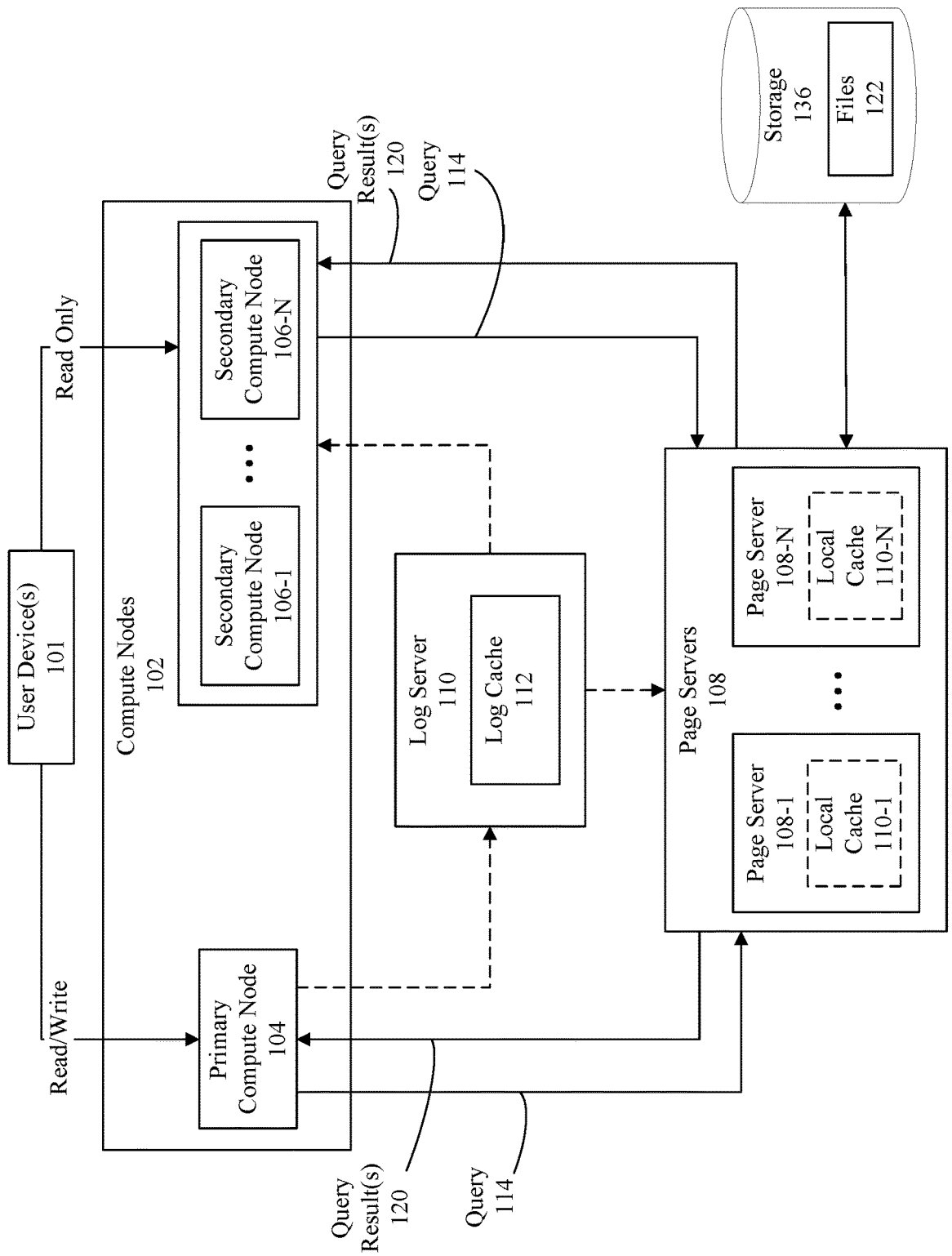
FIG. 1 depicts a block diagram of a distributed database system configured for separating logical from physical storage of a database file stored in the system, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for separating logical and physical storage of database files in a distributed database system. Section III below describes example computing device embodiments that may be used to implement features of the embodiments described herein. Section IV below describes additional examples and advantages, and Section V provides some concluding remarks.

II. Example Embodiments

As described above, distributed database systems exist whereby compute resources and storage resources are segregated such that one or more compute nodes (i.e., servers dedicated to performing 'compute' functions) are coupled to, for example, n page servers with each page server managing access to and/or modification of one $n^{th}$ of the pages that comprise the data stored in the database. In such a system, compute nodes handle all incoming user queries and query processing activities, whereas page servers couple to storage components to provide a scaled-out storage engine with each page server responsible for its subset of pages of the database. Some such systems employ storage subsystems that may have limited or no separation between logical and physical file storage. That is, logical files may correspond one-to-one with a physical file homed on a single storage device (e.g., a single drive/spindle). In such situations, scalability issues may arise that compromise storage performance and/or the costs associated with delivering service at a desired or required performance level.

Embodiments described herein decouple logical file storage from the underlying physical storage of that file while simultaneously improving performance by:

Redirecting a logical database file to multiple page servers using endpoint mapping Separating the logical database file into slices Sub-dividing the slices into smaller striped and strided cells to improve overall performance These aspects of embodiments may be better understood in context of an example distributed database system in which embodiments may be implemented. For example, consider FIG. 1 which depicts a block diagram of a distributed database system 100 configured for separating logical from physical storage of a database file stored in the system, according to an example embodiment. Distributed database system 100 is one example system in which embodiments may be implemented but is not intended to be limiting. Embodiments may be implemented in further types of distributed database systems, as would be apparent to the persons skilled in the relevant art(s) from the teachings herein.

Distributed database system 100 manages one or more databases in which data is stored across different physical locations. The devices of system 100 may be located in a same physical location (e.g., a data center) or may be dispersed over a network of interconnected computers. System 100 may manage databases according to any suitable database models (e.g., relational or XML), and may implemented any suitable query language(s) to access the database, including SQL (Structured Query Language) or XQuery. Distributed database system 100 as shown in FIG. 1 includes one or more compute nodes 102, a log server 110, one or more page servers 108, and storage 136. Compute nodes 102 includes a primary compute node 104, and a set of secondary compute nodes 106-1 through 106-N. Likewise, page servers 108 includes a set of page servers 108-1 through 108-N. Log server 110 includes a log cache 112. These features of system 100 are described in further detail as follows.

Any number of user devices 101 may access data managed by distributed database system 100. User device(s) 101 are coupled to one or more compute nodes and provide a workload to distributed database system 100 in the form of transactions and other queries. The primary and secondary compute nodes of compute nodes 102 are coupled to log server 110 and to one or more of page servers 108. User device(s) 101 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server.

Note, that although embodiments may at times be described herein in the context of a user device such as user device(s) 101 providing queries or a workload of queries and receiving query results in return, embodiments are not limited to operating with or through user devices such as user device(s) 101. Indeed, embodiments described herein may perform queries for or on behalf of any source of such queries, and provide query results to same, or to some other source or entity. For example, queries may be generated by computing components (not shown in FIG. 1) and provided to embodiments for execution. Thereafter, embodiments may execute the queries in the manner described herein and provide the results either directly back to the query source, or to some other location, entity or component as appropriate.

Compute nodes 102, page servers 108, and log server 100 may include any number of computing devices (e.g., servers) that include hardware (e.g., processors, memory, storage, networking components) and software (e.g., database management system (DBMS) software, etc.) configured to interact with user devices 101, and to manage accesses (including reads, writes, modifications, etc.) to stored data of one or more databases.

In an embodiment, each of page servers 108 is configured to store separate pieces of a single database file. Although storage 136 and files 122 stored therein are depicted as a monolithic storage shared among page servers 108, embodiments are not so limited. In alternative embodiments (not shown), each of page servers 108 may be coupled to a dedicated storage that includes only the files 122 managed and stored by that particular page server. Likewise, embodiments may be configured anywhere in between with some of the files corresponding to a given page server being stored at one location on one storage unit, and other pages elsewhere.

As mentioned herein above, distributed database system 100 may be configured to perform transaction processing. Embodiments of distributed database system 100 are ACID compliant. As known in the art, ACID is an acronym that denotes a set of properties of database transactions that ensure that data persisted to the database is valid despite errors that may arise due to, for example, hardware failures or power failures. The ACID are Atomicity, Consistency, Isolation and Durability. Transactions performed by distributed database system 100 are ACID compliant because the operations that logically correspond to the transaction collectively satisfy the ACID properties.

The Atomicity property of a transaction demands that the transaction either completely succeed, or completely fail. For a transaction to completely fail means that the database is left unchanged. For example, suppose a transaction comprises transferring money from account A to account B. The entire transaction comprises a number of steps such as, for example: funds are debited from account A, funds are transferred to wherever account B is held, and funds are credited to account B. In this situation, atomicity guarantees that no funds are debited from account A if, for whatever reason, funds are not credited to account B.

The Consistency property ensures that a transaction conform to all applicable rules governing the storage of the data such that the transaction brings the database from one valid state to another valid state.

The Isolation property ensures that different transactions that execute concurrently leave the database in the same state that would have been obtained if the transactions were executed in series.

Finally, the Durability property guarantees that once a transaction is committed (i.e., completed and persisted to the database in an ACID-compliant manner), the transaction will remain committed and that no hardware, system or power failure can cause a transaction to be lost or for the database to enter an otherwise inconsistent state. With further reference to distributed database system 100 of FIG. 1, ACID properties of transactions performed by distributed database system 100 are ensured, in part, through the use of log server 110 as follows.

In an embodiment, primary compute node 104 is configured to perform both read and write operations, whereas secondary compute nodes 106-1 through 106-N are configured to perform read-only operations. Thus, only primary compute node 104 can perform transactions that alter the state of the database. In order to maintain the ACID properties of the transaction, primary compute node 104 may be configured to generate a log record for the transaction when the transaction commits and store that record locally in a transaction log before any database modifications caused by the transaction are written to disk.

A log record for a committed transaction includes all the information necessary to re-do the transaction in the event there is a problem (e.g., power failure) before the data modified by the transaction can be stored (e.g., in files 122 of storage 136). A log record may comprise information that includes, but is not limited to, a transaction identifier, a log sequence number, a time stamp, information indicating what data object or objects was/were modified and how, and the like.

Regarding a log sequence number, the transaction log operates logically as if the transaction log is a sequence of log records with each log record identified by a log sequence number (LSN). Each new log record is written to the logical end of the transaction log with an LSN that is higher than the LSN of the record before it. Log records are stored in a serial sequence as they are created such that if LSN2 is greater than LSN1, the change described by the log record referred to by LSN2 occurred after the change described by the log record LSN1. Each log record also contains a transaction identifier of the transaction to which it belongs. That is, a transaction identifier is information that uniquely identifies the transaction corresponding to the log record (e.g., a universally unique identifier (UUID) or globally unique identifier (GUID)).

The log record corresponding to the transaction is thereafter forwarded to log server 110 which is configured to provide a log service, in an embodiment. The log service on log server 110 accepts log records from the primary compute node 104, persists them in log cache 112, and subsequently forwards the log records to the rest of the compute replicas (i.e., secondary compute node 106-1 to 106-N) so they can update their local log caches. Log server 110 also forwards the log records to the relevant page server(s) (i.e., the page servers that are managing the data that was modified by the transaction) so that the data can be updated there.

In this way, all data changes from primary compute node 104 are propagated through the log service to all the secondary compute nodes and page servers. Finally, the log records are pushed out to long-term storage such as, for example, storage 136. In addition to transaction commits, other types of operations are may also be recorded at primary compute node 104 and subsequently be forwarded including, but not limited to, the start of a transaction, extent and page allocation or deallocation, creating or dropping a table or index and every data or schema modification.

As mentioned above, when logical file storage is substantially or wholly coextensive of the physical storage of that file, a number of problems arise. Such problems include and/or are related to a) replica re-creation, b) remote storage I/O limits, c) data archiving (i.e., storage tier modification). Each will now be described in turn.

The primary issue with replica re-creation is one of file size. For example, suppose a single 1 TB file is stored in files 122 and is managed by page server 108-1 of page servers 108. If page server 108-1 fails (or, e.g., the SQL instance hosted thereon or indeed any fault that prevents page server 108-1 from fulfilling its role), then another page server and SQL instance (e.g., page server 108-N) must be spun up to replace the failed page server. Subsequently, the 1 TB data file must be read into local cache 110-N from files 122. During the process of re-creating the cached copy of the 1 TB data file, page server 110-N must continue to respond read requests and maintain the file modifications coming from the log records being received from log server 110. During cache recovery, query performance (i.e., read workload) at page server 110-N may suffer significantly since page server 110-N cannot simultaneously keep up with the number of changes coming in from log server 110 (i.e., the write workload). As a further consequence, page server 108-N may cause throttling of the log pipeline which in turn causes the throughput of log server 110 to drop.

Embodiments solve the replica re-creation problem by dividing the 1 TB logical file into multiple file slices that are each independently maintainable by different instances of page servers 108. As such, the amount of the 1 TB data file "owned" by any one-page server is configurable which permits much faster replica re-creation since the amount of data owned by any one-page server is much smaller. Furthermore, throughput of log record application is enhanced since each page server is responsible for only a portion of a single file, and log records corresponding to modifications not owned by that page server can be ignored.

Remote storage I/O limits are also severely tested when large logical files are maintained as large physical files. This is particularly true with online transaction processing ("OLTP") workloads that typically make modifications to many little rows. In such instances, the number of changes for a given page server may overwhelm the I/O capability of storage 136. Typical bandwidth may be between 500 and 1000 IOs/second for a standard storage configuration. To increase transaction throughput, one may home the file on better performing hardware. But there are limits to even the best current hardware and, in any event, such hardware is very expensive.

Embodiments address the storage I/O limits by further dividing the slices described herein above into striped and strided cells, with different cells being homed on different physical storage devices (i.e., different drives/spindles) either in the page server cache, on storage 136, or both. As will described further below, such a configuration permits I/O operations to be performed in parallel thereby enhancing performance.

The above-described parallelization of I/O also solves the issues related to data archiving and/or storage tier modification. It is common in data warehouse scenarios to have "hot" and "cold" data. Hot data is data within the database that is currently the target of a large number of queries (whether read or write queries) of the present workload. Cold data, on the other hand, corresponds to data that is not currently in demand and may for which very few queries are being received.

For example, a database application may be configured to monitor financial data over time. In such a situation, the query activity may be focused more on the most recent financial data (i.e., the "hot" data). As time passes and the data ages, however, fewer to no queries may be targeting such data which is then said to be "cold." Because there is little need to access such data, it may be preferable to use a different storage configuration for storing the data. For example, higher performing and more expensive cache memory or solid-state drive ("SSD") caches dedicated to such cold data may be reassigned to hot data. Alternatively, cold data may be moved onto cheaper and slower storage subsystems (e.g., from SSD drives to spindle-based drives, or from spindle-based drives to tape).

However, migrating a single large file that is homed on a single storage device from one storage configuration or tier to another is quite slow since the files are too big. Embodiments, on the other hand, break a large logical file into a large number of little physical files which, as described above, allows copying to be parallelized to become a constant-time operation. After copying the data to a new configuration completes, a new page server instance may be created scoped to the data, and compute node 104, for example, may create a new endpoint mapping for the new page server, remove the old endpoint mapping which causes future read traffic to redirect to the new page server, all without a single disconnect from the ongoing workload. The concept of an "endpoint mapping" will now be described with references to FIGS. 2 and 3.

Figure 2:
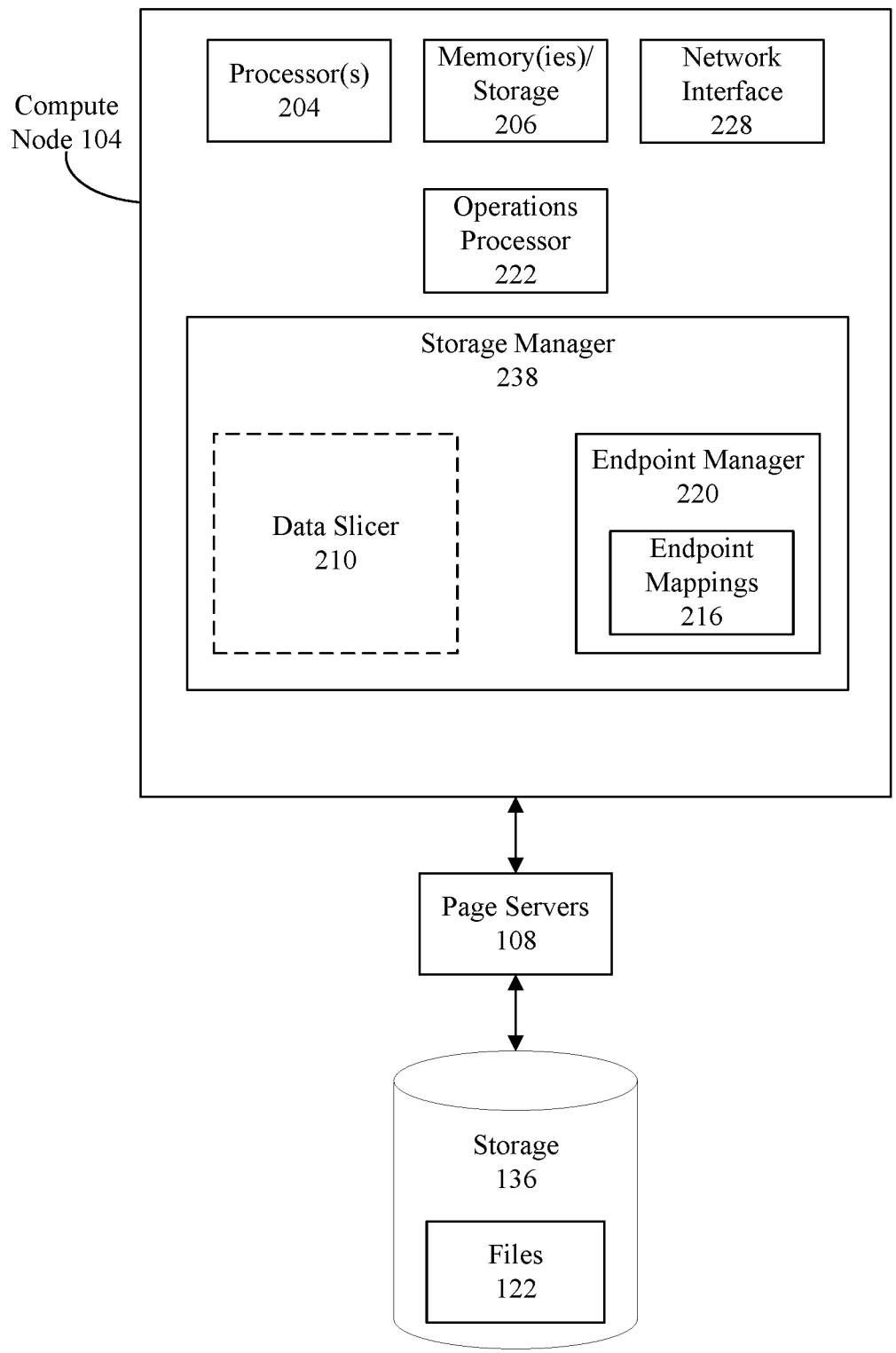
FIG. 2 depicts a block diagram of an example compute node configured for separating logical from physical storage of a database file stored in the distributed database system of FIG. 1, according to an example embodiment.

FIG. 2 depicts a block diagram of a system 200 that includes storage 136, page server(s) 108, and compute node 104 configured for separating logical from physical storage of a database file stored in distributed database system 100 of FIG. 1, according to an example embodiment. System 200 is described as follows.

System 200 includes a compute node 104 coupled to page servers 108 which are in turn coupled to storage 136 as also illustrated in FIG. 1. Compute node 104 may comprise any type of server or computing system, as mentioned elsewhere herein, or as otherwise known, including without limitation cloud-based systems, on-premises servers, distributed network architectures, and/or the like.

As shown in FIG. 2, compute node 104 includes a processor 204, a memory/storage 206, a network interface 228, an operations processor 222 and a storage manager 238. Storage 136 includes files 122. Storage manager 238 includes an endpoint manager 220 and optionally includes a data slicer 210 (with such optionality denoted by the dashed line of data slicer 210 as depicted). These components of system 200 are described as follows.

It is contemplated herein that any components of compute node 104 may be grouped, combined, separated, etc., from any other components in various embodiments, and that the illustrated example of compute node 104 in FIG. 2 is non-limiting in its configuration and/or numbers of components, as well as the exemplary arrangement thereof. Moreover, it should be understood that components such as, for example, processor(s) 204, memory(ies)/storage 206 and/or network interface 228 may include a plurality of instances of such components whether physical or virtual.

Processor(s) 204 and memory(ies)/storage 206 may respectively be any type of processor circuit(s)/system(s) and memory that is described herein, and/or as would be understood by a person of skill in the relevant art(s) having the benefit of this disclosure. Processor(s) 204 and memory(ies)/storage 206 may each respectively comprise one or more processors or memories, different types of processors or memories (e.g., one or more types/numbers of caches for query processing, allocations for data storage, etc.), remote processors or memories, and/or distributed processors or memories. Processor 204 may be multi-core processors configured to execute more than one processing thread concurrently. Processor(s) 204 may comprise circuitry that is configured to execute and/or process computer program instructions such as, but not limited to, embodiments of storage manager 238 and/or data slicer 210, including one or more of the components thereof as described herein, which may be implemented as computer program instructions, as described herein. For example, in performance/operation of any of flowcharts 600, 700 and/or 800 of FIGS. 6, 7 and 8, respectively, as described in detail herein below, processor(s) 204 may execute program instructions as described.

Operations processor 222 may be a query processor or a portion of a database server/system, in embodiments, configured to perform database operations such as performing queries against a database. Operations processor 222 may comprise program instructions that are carried out by processor(s) 204, in embodiments, or may be a hardware-based processing device as described herein.

Memory(ies)/storage 206 includes volatile storage portions such as a random access memory (RAM) and/or persistent storage portions such as hard drives, non-volatile RAM, and/or the like, to store or be configured to store computer program instructions/code for separating logical and physical storage of database files in a distributed database system, as described herein, as well as to store other information and data described in this disclosure including, without limitation, embodiments of storage manager 238 and/or data slicer 210, including one or more of the components thereof as described herein, and/or the like, in different embodiments.

Storage 136 may be internal and/or external storage or any type, such as those disclosed herein. In embodiments, storage 136 stores one or more files 122 that comprise a database object or database file, and that may be accessed only by or through a page sever of page servers 108. In embodiments, storage 136 may also store files 122 and/or portions of files provided from one or more pages servers responsive to requests from compute node 104.

Network interface 228 may be any type or number of wired and/or wireless network adapter, modem, etc., configured to enable compute node 104, to communicate intra-system with components thereof, as well as with other devices and/or systems over a network, such as communications between compute node 104 and other devices, systems, hosts, of system 100 in FIG. 1.

Compute node 104 also includes additional components (not shown for brevity and illustrative clarity) including, but not limited to, components and subcomponents of other devices and/or systems herein, as well as those described below with respect to FIG. 9 e.g., an operating system, etc., according to embodiments.

Endpoint manager 220 of storage manager 238 of compute node 104 as depicted in system 200 of FIG. 2 will now be described in conjunction with FIG. 3. which is a block diagram 300 depicting example endpoint mappings 216 for logical database files 318-328 stored in database 302 of distributed database system 100 of FIG. 1, according to an example embodiment.

Block diagram 300 also includes PageserverA 314 and PageserverC 316 which are instances of page servers 108. Block diagram 300 also includes storage 136 as shown in FIGS. 1 and 2.

Each of logical database files 318-322 are part of filegroup 304. Likewise, logical database files 324-328 are depicted in FIG. 3 as being part of filegroup 306. Each of logical database files 318-328 are likewise associated with a FileID as shown in the depiction of each database file. More specifically, logical database files 318-328 have FileIDs of M, 11, 10, N, 2 and 8, respectively.

Figure 3:
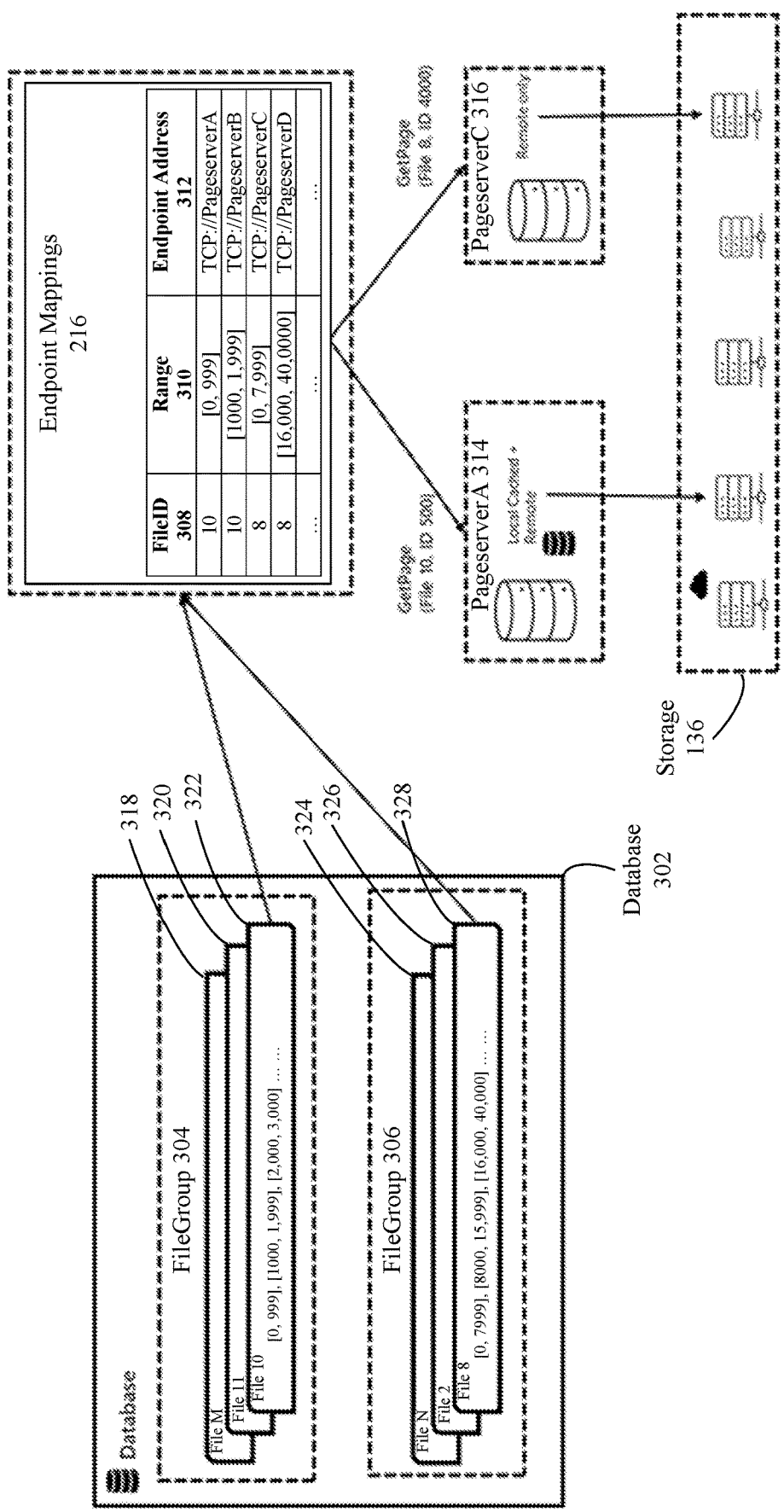
FIG. 3 shows a block diagram including example endpoint mappings for database files stored in a database of the distributed database system of FIG. 1, according to an example embodiment.

With continued reference to FIG. 2, endpoint manager 220 of storage manager 238 is configured to create and maintain endpoint mappings 216 as shown in FIG. 3. More specifically, when a logical database file is created in database 302 (e.g., by action of a query, command, import, migration, replication or other means of putting data into a new database file), embodiments of storage manager 238 of compute node 104 may be configured to operate in conjunction with, for example, operations processor 222 to slice the logical database file into slices each of which are managed by one of page servers 108. Accordingly, a slice comprises a contiguous sub-portion of a logical database file. A slice is the basic allocation unit of storage for a logical file. A slice may have different sizes in different embodiments. Likewise, some embodiments support different size slices (e.g., support both 16 GB and 128 GB size slices). Naturally, a logical database file may be smaller than, for example, 16 GB and in such instances, such a file fits within a single slice and is subsequently managed by only a single page server. Nevertheless, and as will be discussed further below, embodiments further decompose the data stored in a slice into smaller units of physical storage to realize the benefits of the previously described parallelism.

With continued reference to FIG. 3, each slice is given an entry in endpoint mappings 216. Each such entry in endpoint mappings 216 includes an identifier that uniquely identifies the logical database file to which the slice belongs. These identifiers are shown as, for example, the entries in column FileID 308 of endpoint mappings 216.

Entries in endpoint mappings 216 also include a range identifier which corresponds to the slice in question and that denotes, for example, the range of pages covered by the slice and hence the location of the data of the slice within the logical database file for that entry. For example, the column denoted range 310 of endpoint mappings 216 comprises a range identifier. Note that the page range need not correspond 1:1 with the size of a slice.

Lastly, each entry in endpoint mappings 216 includes the endpoint address of the page server assigned to manage the slice. For example, the entries of column endpoint address 312 as shown in endpoint mappings 216 of FIG. 3 comprise an endpoint address entry. The entries in endpoint address 312 are formatted so as to specify a protocol (i.e., 'TCP') and a page server name (e.g., 'PageserverA'). It should be understood, however, that an endpoint address need not follow such a format, and any type of identifier that uniquely identifies the page server in a given entry will suffice.

Furthermore, a slice range need not be a constant size. For example, logical database files 322 and 328 of database 302 as shown in FIG. 3 are each divided into ranges of 1,000, 8,000 or 24,000 storage units, respectively. The storage unit of a range may be different in different embodiments. For example, a storage unit may comprise some fixed number of gigabyte blocks. Alternatively, the storage unit of a range may be data pages (i.e., 8 kilobyte data pages as typical in Microsoft SQL Server).

With continued reference to FIG. 2, endpoint manager 220 is responsible for assigning each slice to a particular page server. For example, and with reference to endpoint mappings 216 as depicted in FIG. 3, the first 8000 storage units of logical database file 328 (i.e., having FileID=8) is assigned to endpoint TCP://PageserverC as illustrated in the third row of endpoint mappings 216. In an embodiment, storage manager 238 is configured to receive or possess information about the performance capabilities of each page server that exists or that may be created, and may be further configured to assign a larger range to page server instances that are more capable (e.g., have more processing power, RAM, cache memory, network bandwidth, and the like).

Endpoint mappings 216 is used for various purposes in different embodiments. For example, compute node 104 may be called upon to satisfy a query that requires data to be read from logical file 328. In such an instance, operations processor 222 of compute node 104 as shown in FIG. 2 may determine that data from one or more pages in the range [0, 7999] is to be retrieved. In such an instance, endpoint mappings 216 is consulted to determine which page server holds the relevant data, and a request (e.g., a GetPage call) may be sent to the correct page server. In the example above, such a request would be sent to PageserverC 316.

In another embodiment, and with reference to FIG. 1, log server 110 may be configured to receive and use a copy of endpoint mappings 216 to send log updates for a given database update only to the relevant page server (as opposed to, for example, all page servers receiving all log updates and each page server selectively ignoring those log updates not scoped to itself).

As described above, embodiments theoretically enable slices of any size. In one embodiment, for example, slices may be 16 GB or 128 GB in size and may (as described generally above) be further processed to either decompose the slices into smaller units, to rearrange the ordering of data in physical storage, or both. For example, slices may be composed of cells. A cell is a consistency unit that can be maintained independently from other cells. That is, a cell includes not only the data stored within the cell, but also metadata that permits a page server to perform I/O operations on the data contained in a cell. As such, cells from the same logical file need not be managed by the same page server. For example, consider FIG. 4.

Figure 4:
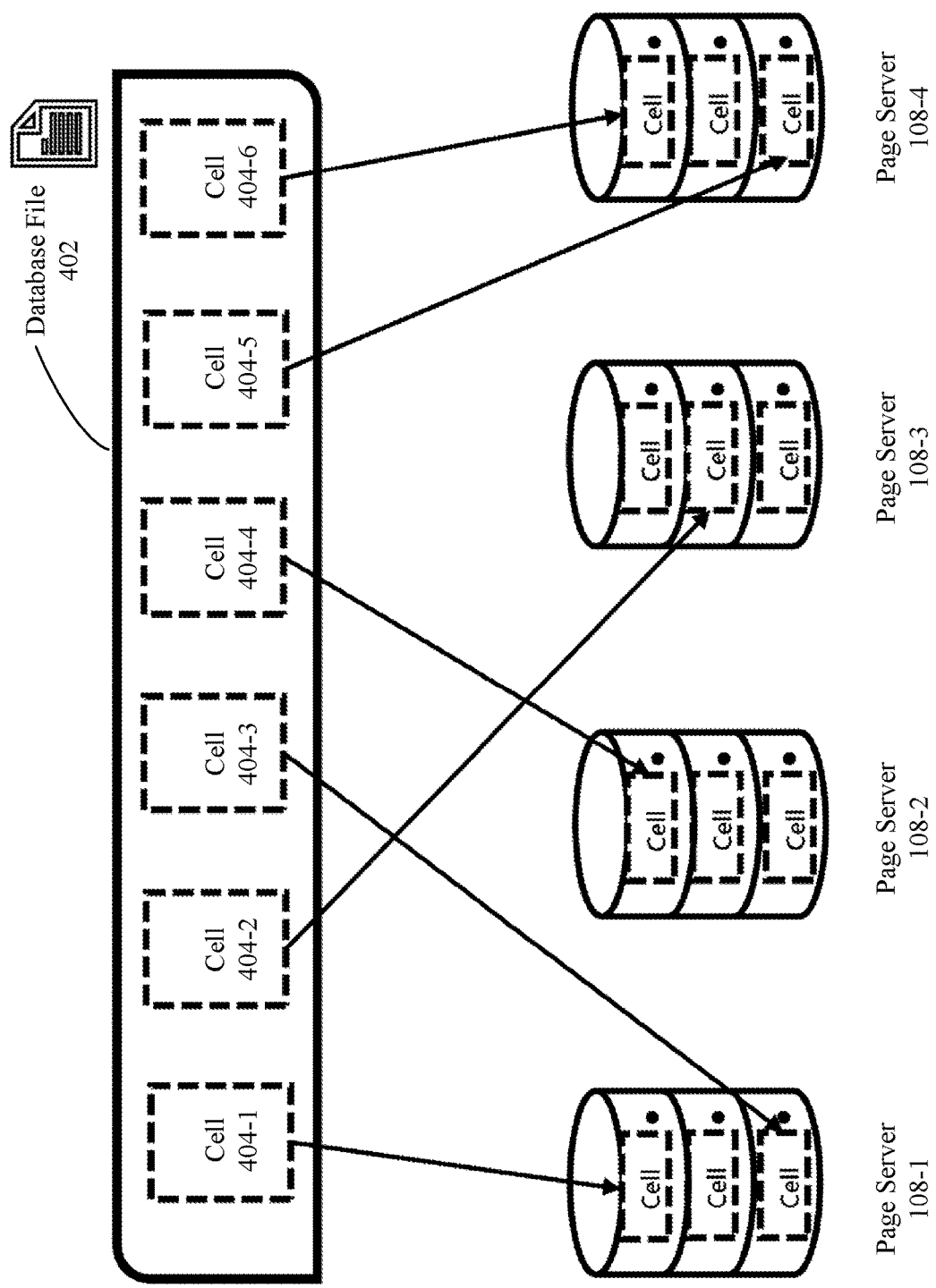
FIG. 4 shows a block diagram of an example system illustrating a distribution of cells of a database file amongst a plurality of page servers of the distributed database system of FIG. 1, according to an example embodiment.

FIG. 4 shows an example distribution 400 of cells 404-1 to 404-6 of a database file 402 amongst a plurality of page servers 108-1 to 108-4 of the distributed database system 100 of FIG. 1, according to an example embodiment. As described above, slices of a logical database file are each distributed to different page servers to manage. In the distribution depicted in FIG. 4, each cell is also a slice. This is because a slice must be composed of at least one cell (but may have more) and in the example of FIG. 4, each slice is composed of one cell. In the depicted embodiment, therefore, a single cell may hold 16 GB since that is the capacity of a single slice. When a slice is configured to contain 128 GB, on the other hand, such a slice will be composed of 8 cells (i.e., since 128 GB/16 GB=8). In that instance, all the cells of the slice will be managed by the same page server since slices map 1:1 to page server instances (note: this configuration is not illustrated in FIG. 4). Of course, in other embodiments, a slice may be larger or smaller than 128 GB and composed of an appropriate number of cells depending on the selected cell size for that embodiment.

In sum, embodiments are configured to store a logical database file across disparate page servers by decomposing the logical file into 16 GB or 128 GB slices, wherein such slices are themselves composed of one or more 16 GB cells. In an embodiment, a cell may be further decomposed into four 4 GB stripes (i.e., blobs or files), wherein such stripes may also be strided to provide further performance enhancements. A stride is a chunk of sequential data that is read (or written) from one stripe before (or while) the sequential read operation continues using the next stripe. Such a storage configuration may be better understood in the context of FIG. 5.

FIG. 5 depicts example data organization of contiguous chunks 502 of data of logical database file 402 into a cell 504, striped cell 506 and striped/strided cell 508, according to an example embodiment. Suppose that each chunk of contiguous chunks 502 numbered 1 through 16 of logical database file 402 comprises 1 GB of data. As such, each of contiguous chunks 502 numbered 1 through 16 may be stored together in a single cell (since in our running example a cell contains 16 GB) as depicted by cell 504.

If cell 504 were stored as a single physical file, however, then reading data from, for example, chunk 6 would require reading all of cell 504. To address this issue, embodiments physically store each cell in a collection of distinct physical files called stripes, wherein each stripe is stored on a different physical storage device (e.g., SSD or HDD). In one embodiment, the stripes forming a cell may all be of the same size, although in an alternative embodiment, the stripes forming a cell may be of different sizes. Such an arrangement is depicted as striped cell 506 with the chunks of cell 504 divided among stripes 508 to 514. Arranging data as shown in striped cell 506 has the advantage that reading some random chunk (e.g., chunk 6) requires reading only the stripe that contains that chunk which in this example is only ¼ the size of the entire cell. Moreover, since each stripe is stored on a different device, reading the entire cell may be up to 4× faster due to the parallel reads. Further optimizations are, however, possible.

The issue with striped cell 506 is that parallel reads are not guaranteed when reading only a contiguous portion of the cell. For example, reading chunks 1-4 of stripe 508 of striped cell 506 will have no parallelism since all those chunks are stored on the single storage device that corresponds to stripe 508. Similarly, a read of chunks 3 through 6 may occur in parallel across only the two storage devices that correspond to each of stripes 508 and 510.

Embodiments may, however, stride the chunks across strips in the manner shown, for example, in striped/strided cell 524 of FIG. 5. A stride is the chunk/segment of sequential data that is read from one disk (stripe) before the sequential read operation continues to the next disk (stripe). Striped/strided cell 524 organizes chunks 1-16 of contiguous chunks 502 into a cell that includes 4 stripes, but also strides the data in a round-robin fashion across those stripes to produce strided stripes 516 through 522. As depicted in FIG. 5, the data stored in strided stripes 516 through 522 is distributed such that contiguous chunks are *always* stored in different stripes (and hence on different storage devices). As a consequence, sequential reads will always engage multiple stripes and hence multiple physical storage devices.

Consider, for example, reading chunks 1-4 as described above. In that instance, every stripe of strided/striped cell 524 may be read in parallel which, all else being equal, should be 4× faster than performing that read using striped cell 506. Similarly, reading chunks 3 to 6 will also engage all four stripes of striped/strided cell 524 instead of only two of striped cell 506 as described above for a 2× speedup. In the context of FIG. 5, each chunk is a stride. So, chunk 1 is read from strided stripe 516 (e.g., on its own disk) and then the sequential read operation must continue by reading chunk 2 from strided stripe 518.

Note, the strides of each striped/strided cell 524 are depicted in FIG. 5 as being the same size as each chunk: 1

GB. Embodiments may, however, stride the stripes using a smaller granularity (e.g., 1 MB) which will dramatically increase the probability of using multiple stripes (and hence multiple physical devices) for an extended or random read. For example, 1 MB portions or chunks of each of contiguous chunks 502 may be strided across each strided stripe in round robin fashion.

Figure 6:
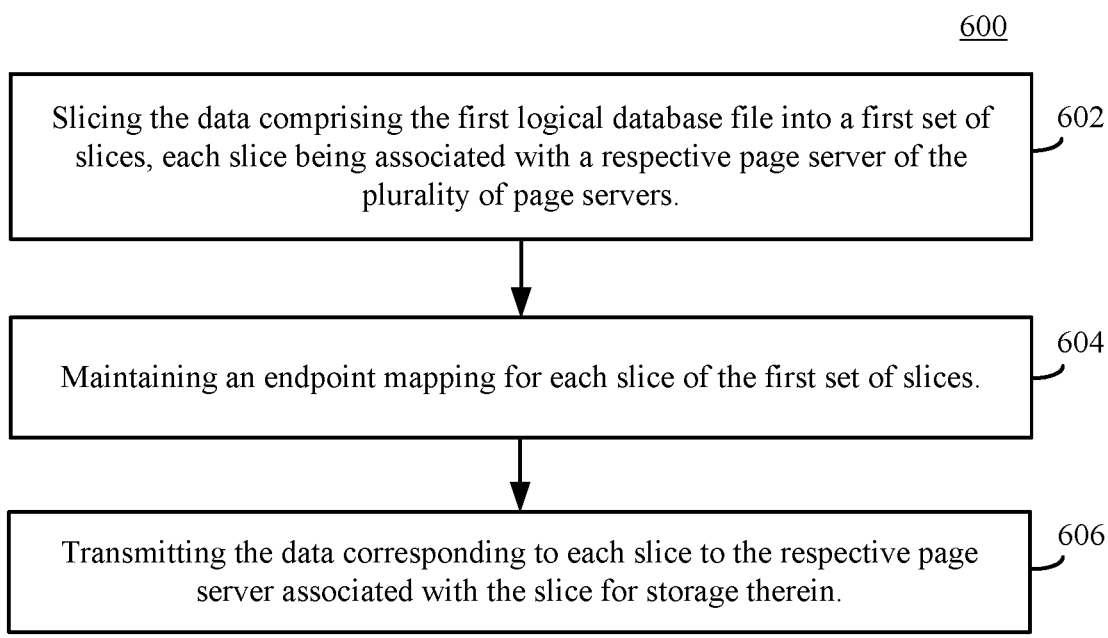
FIG. 6 depicts a flowchart of a method for separating logical from physical storage in a database file stored in a distributed database system, according to an example embodiment.

In embodiments, distributed database system 100 of FIG. 1, including page servers 108 as well as compute node 104 as depicted in FIG. 2, may be used in various ways to separate logical and physical storage of database files. For example, FIG. 6 depicts a flowchart 600 of a method for separating logical from physical storage in a database file stored in the distributed database system 100 of FIG. 1, according to an example embodiment. Flowchart 600 is described with continued reference to FIGS. 1 and 2. However, other structural and operational embodiments will be apparent to persons skilled in the relevant art(s) based on the following discussion regarding flowchart 600.

Flowchart 600 begins with step 602. At step 602, the data comprising the first logical database file is sliced into a first set of slices, each slice being associated with a respective page server of the plurality of page servers. For example, and with continued reference to distributed database system 100 and page servers 108 of FIG. 1, and compute node 104 of FIG. 2, data slicer 210 of storage manager 238 of compute node 104 as shown in FIG. 2 may be configured to slice a database file into slices in the manner described herein above.

More specifically, data slicer 210 may slice a database file into slice of predetermined size (e.g., 16 GB or 128 GB, in certain embodiments). As also described herein above, each such slice is thereafter assigned to a page servers of page servers 108 for storage and management thereby. Flowchart 600 continues at step 604.

At step 604, an endpoint mapping for each slice of the first set of slices is maintained. For example, and with continued reference to distributed database system 100 and page servers 108 of FIG. 1, and compute node 104 of FIG. 2, endpoint manager 220 of storage manager 238 of compute node 104 may be configured to create and manage endpoint mappings 216.

As described above, endpoint mappings 216 may comprise a lookup table or other data structure that includes a file identifier for each slice that identifies the corresponding database file from which the slice was created, a slice range that specifies the location of the data of the slice within the logical database file that corresponds to the file identifier, and an endpoint address which corresponds to the page server to which the slice is or was assigned. Flowchart 600 concludes at step 606.

At step 606, the data corresponding to each slice is transmitted to the respective page server associated with the slice for storage therein. For example, and with continued reference to distributed database system 100 and page servers 108 of FIG. 1, compute node 104 of FIG. 2, one or more of storage manager 238 and/or operations processor 222 may be configured to cause the data corresponding to each slice to its respective page server as indicated by endpoint mappings 216.

In an embodiment, such data may come directly from compute node 104, whereas in other embodiments, compute node 104 may indirectly cause such data to arrive at the target page server. For example, compute node 104 may be configured to cause one or more of secondary compute nodes 106-1 through 106-N or one or more page servers 108-1 through 108-N to deliver such data directly to the target page server by operation of a query, a pushed down query or query fragment, or some other operation.

The flowchart 600 of FIG. 6 sets forth a method for separating logical and physical storage of a database file according to an embodiment. As described above, different database files may be stored using different storage configurations as illustrated in flowchart 700 of FIG. 7 which depicts a refinement to the method of flowchart 600 of FIG. 6 for providing multiple physical storage configurations, in an embodiment. Distributed database system 100 of FIG. 1 is configured to operate according to flowchart 700 in an embodiment. Further structural and operational examples will be apparent to persons skilled in the relevant art(s) based on the following descriptions.

Flowchart 700 begins at step 702. In step 702, the first logical database file is stored using a first storage configuration. For example, and with continued reference to distributed database system 100 and page servers 108 of FIG. 1, and compute node 104 of FIG. 2, embodiments may be configured to use different hardware and/or configurations thereof in various manners as described herein above.

More specifically, page servers of page servers 108 may be configured to cache data for its slices locally as well as remotely as shown, for example, in FIG. 3 which shows PageserverA 314 being configured cache the data corresponding to its slice of database file 322 locally in addition to storing such data remotely in storage 136. Other storage configurations are of course possible in other embodiments. For example, a storage configuration may utilize cheap commodity storage hardware or may instead utilize state-of-the-art solid-state devices and support infrastructure to enable extremely high transaction rates. Flowchart 700 concludes at step 704.

At step 704, a second logical database file is stored using a second storage configuration. For example, and with continued reference to distributed database system 100 and page servers 108 of FIG. 1, and compute node 104 of FIG. 2, embodiments may be configured to use different hardware and/or configurations thereof in various manners for different database files or filegroups as described herein above. For example, and as shown in FIG. 3, storage of file 322 is managed by PageserverC 316 which does not include local caching which will typically result in slower access time, but likewise at a lower cost of goods sold.

Figure 7:
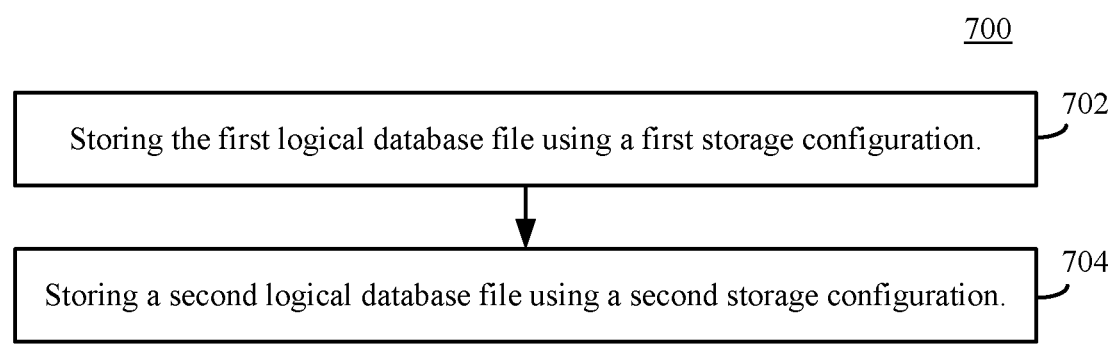
FIG. 7 depicts a flowchart of a refinement to the method of FIG. 6 providing multiple physical storage configurations, according to an example embodiment.

In embodiments, database file storage configurations such as those illustrated in flowchart 700 of FIG. 7 may be changed, and such changes may be accomplished in various ways. For example, FIG. 8 depicts a flowchart 800 of a refinement to the method of FIG. 7 providing a method for changing physical storage configurations of data stored in a distributed database, according to an example embodiment. Distributed database system 100 of FIG. 1 may be configured to operate according to flowchart 700 in an embodiment. Accordingly, flowchart 800 is described with continued reference to FIGS. 1 and 2. However, other structural and operational embodiments will be apparent to persons skilled in the relevant art(s) based on the following discussion regarding flowchart 800.

Flowchart 800 includes step 802. In step 802, the storage of the first or the second logical database file is changed to use a third storage configuration by moving the slices comprising the respective logical database file to one or more new endpoint address and updating the endpoint mapping of each slice to one of the one or more new endpoint addresses, or by b) changing a hardware configuration of the first or the second storage configuration, respectively, to be a third storage configuration.

For example, and with continued reference to distributed database system 100 and page servers 108 of FIG. 1, and compute node 104 of FIG. 2, storage configurations for different files or file groups may be changed in numerous ways as described herein above. For example, slices may be moved to a different page server or page servers that have a different configuration (e.g., that do or do not have local caching). For example, and with reference to FIG. 3, database file 328 which is presently being managed by PageserverC 316 may be copied to PageserverA 314 which includes local caching, and endpoint mappings 216 subsequently updated to reflect the new endpoint once such copying has completed.

Alternatively, slices may continue to be managed at the same page server of page servers 108, but the storage configuration for that page server being changed with respect to the relevant slice. For example, and with reference to FIG. 3, the storage configuration for database file 322 being managed by PageserverA 314 may be changed by disabling local caching, but otherwise leaving the stored slice in place.

III. Example Computer System Implementation

As noted herein, the embodiments described, including but not limited to, distributed database system 100, primary compute node 104, secondary compute nodes 106-1 to 106-N, log server 110, page server 108-1 to 108-N of page servers 108 or storage 136 of FIG. 1, or storage manager 238, data slicer 210 or endpoint manager 220 of compute node 104 of FIG. 2, along with any components and/or subcomponents thereof, as well any operations and portions of flowcharts/flow diagrams described herein and/or further examples described herein, may be implemented in hardware, or hardware combined with software and/or firmware including being implemented as computer program code/instructions configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration and are not intended to be limiting. Embodiments may be implemented in further types of computer systems, as would be known to persons skilled in the relevant art(s).

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration and are not intended to be limiting. Embodiments may be implemented in further types of computer systems, as would be known to persons skilled in the relevant art(s).

Figure 9:
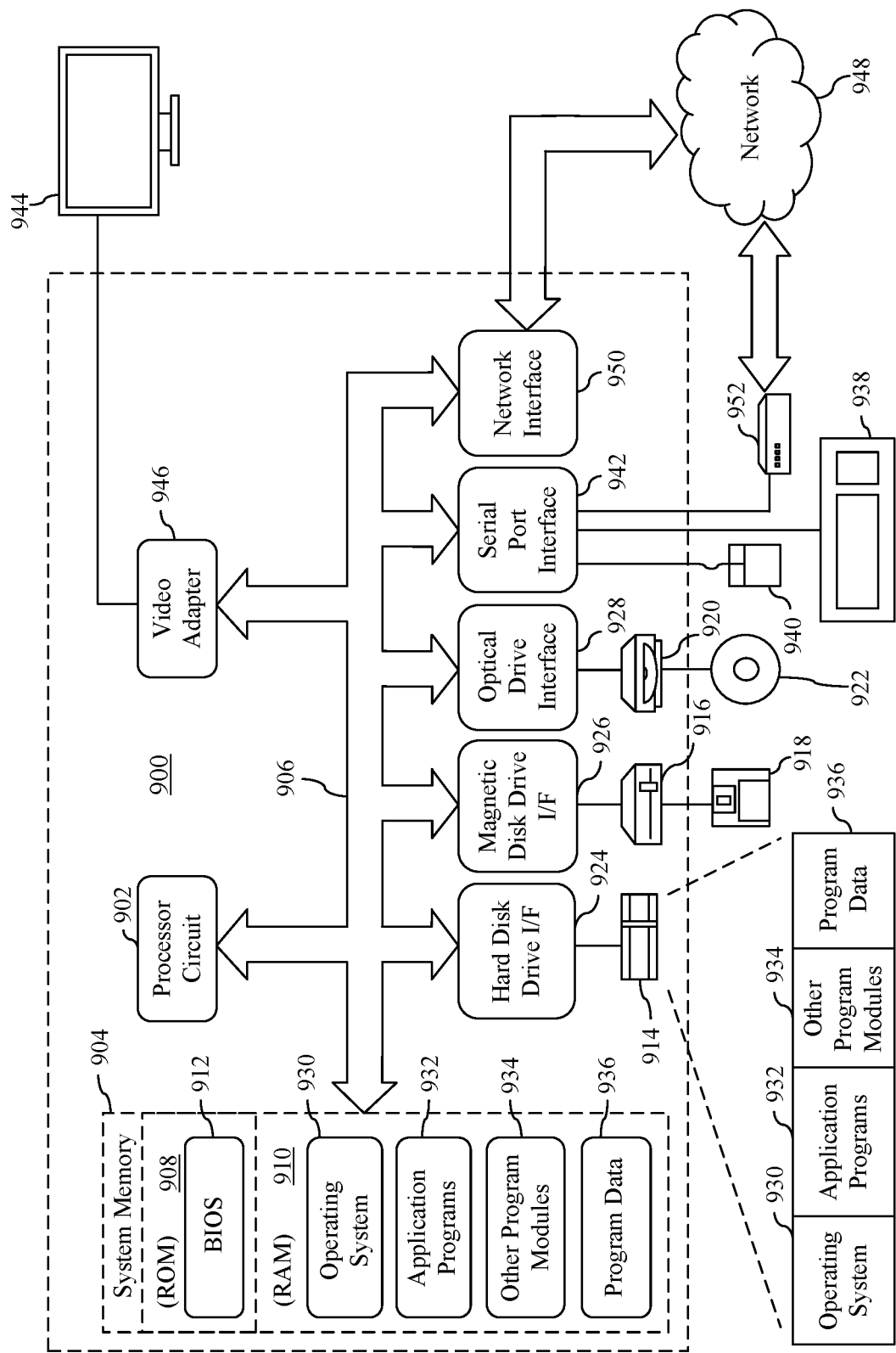
FIG. 9 is a block diagram of an example computer system in which embodiments may be implemented.

FIG. 9 depicts an exemplary implementation of a computing device 900 in which embodiments may be implemented. For example, embodiments described herein may be implemented in one or more computing devices similar to computing device 900 in stationary or mobile computer embodiments, including one or more features of computing device 900 and/or alternative features. The description of computing device 900 provided herein is provided for purposes of illustration and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing embodiments described herein, such as but not limited to distributed database system 100, primary compute node 104, secondary compute nodes 106-1 to 106-N, log server 110, page server 108-1 to 108-N of page servers 108 or storage 136 of FIG. 1, or storage manager 238, data slicer 210 or endpoint manager 220 of compute node 104 of FIG. 2, along with any components and/or subcomponents thereof, as well as the flowcharts/flow diagrams described herein, including portions thereof, and/or further examples described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media and propagating signals (do not include communication media or propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments described herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A distributed database system is provided herein, the distributed database system including a distributed database configured to store a first logical database file comprising data and associated with a file identifier, the distributed database system comprising: a plurality of page servers, each page server of the plurality of page servers configurable to store at least one slice comprising a portion of the first logical database file; a compute node coupled to the plurality of page servers and configured to store the first logical database file responsive to a received command, said storing comprising: slicing the data comprising the first logical database file into a first set of slices, each slice being associated with a respective page server of the plurality of page servers; maintaining an endpoint mapping for each slice of the first set of slices; and transmitting the data corresponding to each slice to the respective page server associated with the slice for storage therein.

In an embodiment of the foregoing distributed database system, an endpoint mapping comprises: a database file identifier; a slice identifier that specifies the location of the data that corresponds to the respective slice within a logical database file corresponding to the database file identifier; and an endpoint address corresponding to the page server associated with the respective slice.

In an embodiment of the foregoing distributed database system, the compute node is further configured to: store the first logical database file using a first storage configuration; and store a second logical database file responsive to a received command, wherein the second logical database file is stored using a second storage configuration.

In an embodiment of the foregoing distributed database system, each endpoint address of each endpoint mapping corresponds to one of the first or second storage configurations.

In an embodiment of the foregoing distributed database system, the second storage configuration has a slower access time than the first storage configuration.

In an embodiment of the foregoing distributed database system, the compute node is further configured to: change the storage of the first or the second logical database file to use a third storage configuration by moving the slices comprising the respective logical database file to one or more new endpoint addresses and updating the endpoint mapping of each slice to one of the one or more new endpoint addresses, or by changing a hardware configuration of the first or the second storage configuration, respectively, to be a third storage configuration.

In an embodiment of the foregoing distributed database system, the data comprising each slice is a contiguous fraction of the first logical database file.

In an embodiment of the foregoing distributed database system, each slice comprises a set of cells, each cell comprising a logically consistent unit of storage that may be maintained independently from other cells of the set of cells.

In an embodiment of the foregoing distributed database system, each cell of the set of cells comprises a set of stripes, each stripe comprising a single physical file stored on a physical device that is different than that of every other stripe.

In an embodiment of the foregoing distributed database system, each stripe comprises a set of chunks, each chunk corresponding to a portion of the respective slice that is not contiguous within the respective slice with any other chunk of the set of chunks.

A method of storing a first logical database file across a plurality of page servers of a distributed database system is provided herein. The method comprising: slicing the data comprising the first logical database file into a first set of slices, each slice being associated with a respective page server of the plurality of page servers; maintaining an endpoint mapping for each slice of the first set of slices; and transmitting the data corresponding to each slice to the respective page server associated with the slice for storage therein.

In another embodiment of the foregoing method, an endpoint mapping comprises: a database file identifier; a slice identifier that specifies the location of the data that corresponds to the respective slice within a logical database file corresponding to the database file identifier; and an endpoint address corresponding to the page server associated with the respective slice.

Another embodiment of the foregoing method, further comprises: storing the first logical database file using a first storage configuration; and storing a second logical database file using a second storage configuration.

In another embodiment of the foregoing method, each endpoint address of each endpoint mapping corresponds to one of the first or second storage configurations.

In another embodiment of the foregoing method, the second storage configuration has a slower access time than the first storage configuration.

Another embodiment of the foregoing method, further comprises: changing the storage of the first or the second logical database file to use a third storage configuration by moving the slices comprising the respective logical database file to one or more new endpoint addresses and updating the endpoint mapping of each slice to one of the one or more new endpoint addresses, or by changing a hardware configuration of the first or the second storage configuration, respectively, to be a third storage configuration.

In another embodiment of the foregoing method, the data comprising each slice is a contiguous fraction of the first logical database file.

In another embodiment of the foregoing method, each slice comprises a set of cells, each cell comprising a logically consistent unit of storage that may be maintained independently from other cells of the set of cells.

In another embodiment of the foregoing method, each cell of the set of cells comprises a set of stripes, each stripe comprising a single physical file stored on a physical device that is different than that of every other stripe.

In another embodiment of the foregoing method, each stripe comprises a set of chunks, each chunk corresponding to a portion of respective slice that is not contiguous within the respective slice with any other chunk of the set of chunks.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A distributed database system including a distributed database configured to store a first logical database file comprising data and associated with a file identifier, the distributed database system comprising:
   a plurality of page servers, each page server of the plurality of page servers configurable to store at least one slice comprising a portion of the first logical database file;
   a compute node coupled to the plurality of page servers and configured to store the first logical database file responsive to a received command, said storing comprising:
      slicing the data comprising the first logical database file into a first set of cells, each cell being associated with a respective page server of the plurality of page servers;
      maintaining a plurality of endpoint mappings for a set of contiguous portions of the first logical database file, each endpoint mapping maintained for a corresponding contiguous portion of the set of contiguous portions; and
      transmitting the data corresponding to each cell to the respective page server associated with the cell for storage therein,
   wherein each endpoint mapping comprises:
      a database file identifier corresponding to the first logical database file;
      a range identifier that specifies a location within the first logical database file of the corresponding contiguous portion; and
      an endpoint address corresponding to the page server associated with the respective range identifier.

2. The distributed database system of claim 1, wherein the compute node is further configured to:
   store the first logical database file using a first storage configuration; and
   store a second logical database file using a second storage configuration.

3. The distributed database system of claim 2, wherein each endpoint address of each endpoint mapping corresponds to one of the first or second storage configurations.

4. The distributed database system of claim 2, wherein the second storage configuration has a slower access time than the first storage configuration.

5. The distributed database system of claim 4, wherein the compute node is further configured to:
   change the storing of the first logical database file to use a third storage configuration by moving the first set of cells to one or more new endpoint addresses and updating the endpoint mappings that correspond to the first set of cells to correspond to the one or more new endpoint addresses, or by changing a hardware configuration of the first storage configuration to be a third storage configuration.

6. The distributed database system of claim 1, wherein each contiguous portion of the first logical database file comprises a subset of the first set of cells.

7. The distributed database system of claim 6, wherein each cell of the first set of cells comprises a logically consistent unit of storage that may be maintained independently from other cells of the first set of cells.

8. The distributed database system of claim 7, wherein each cell of the first set of cells comprises a set of stripes, each stripe being stored on a physical device that is different than that of every other stripe.

9. The distributed database system of claim 8, wherein each stripe comprises a set of chunks, each chunk corresponding to a portion of the first logical database file that is not contiguous within the first logical database file with any other chunk of the set of chunks.

10. The distributed database system of claim 1, wherein the compute node is further configured to:
receive a query that requires a chunk from the first logical database file;
determine an endpoint address of a page server storing the chunk based on the maintained endpoint mappings; and
transmit a request for a page containing the chunk to the determined endpoint address.

11. A method of storing a first logical database file across a plurality of page servers of a distributed database system, the first logical database file comprising data and being associated with a first file identifier, the method comprising:
slicing the data comprising the first logical database file into a first set of cells, each cell being associated with a respective page server of the plurality of page servers;
maintaining a plurality of endpoint mappings for a set of contiguous portions of the first logical database file, each endpoint mapping maintained for a corresponding contiguous portion of the set of contiguous portions; and
transmitting the data corresponding to each cell to the respective page server associated with the cell for storage therein,
wherein each endpoint mapping comprises:
a database file identifier corresponding to the first logical database file;
a range identifier that specifies a location within the first logical database file of the corresponding contiguous portion; and
an endpoint address corresponding to the page server associated with the respective range identifier.

12. The method of claim 11, further comprising:
storing the first logical database file using a first storage configuration; and
storing a second logical database file using a second storage configuration.

13. The method of claim 12, wherein each endpoint address of each endpoint mapping corresponds to one of the first or second storage configurations.

14. The method of claim 12, wherein the second storage configuration has a slower access time than the first storage configuration.

15. The method of claim 14, further comprising:
changing the storing of the first logical database file to use a third storage configuration by moving the first set of cells to one or more new endpoint addresses and updating the endpoint mappings that correspond to the first set of cells to correspond to the one or more new endpoint addresses, or by changing a hardware configuration of the first storage configuration to be a third storage configuration.

16. The method of claim 11, wherein each contiguous portion of the first logical database file comprises a subset of the first set of cells.

17. The method of claim 16, wherein each cell of the first set of cells comprising a logically consistent unit of storage that may be maintained independently from other cells of the first set of cells.

18. The method of claim 17, wherein each cell of the first set of cells comprises a set of stripes, each stripe being stored on a physical device that is different than that of every other stripe.

19. The method of claim 18, wherein each stripe comprises a set of chunks, each chunk corresponding to a portion of the first logical database file that is not contiguous within the first logical database file with any other chunk of the set of chunks.

20. The method of claim 18, further comprising:
receiving a query that requires a chunk from the first logical database file;
determining an endpoint address of a page server storing the chunk based on the maintained endpoint mappings; and
transmitting a request for a page containing the chunk to the determined endpoint address.

* * * * *